United States Patent
Nishida (10) Patent No.: US 8,983,465 B2
(45) Date of Patent: Mar. 17, 2015

(54) MOBILE COMMUNICATION METHOD AND MOBILE STATION

(75) Inventor: Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 203 days.

(21) Appl. No.: 13/505,754

(22) PCT Filed: Nov. 5, 2010

(86) PCT No.: PCT/JP2010/069736
§ 371 (c)(1),
(2), (4) Date: Jul. 11, 2012

(87) PCT Pub. No.: WO2011/055797
PCT Pub. Date: May 12, 2011

(65) Prior Publication Data
US 2012/0270548 A1    Oct. 25, 2012

(30) Foreign Application Priority Data

Nov. 6, 2009 (JP) .................. 2009-255588

(51) Int. Cl.
*H04W 4/00* (2009.01)
*H04W 60/00* (2009.01)
*H04W 36/14* (2009.01)

(52) U.S. Cl.
CPC .............. *H04W 60/00* (2013.01); *H04W 36/14* (2013.01)
USPC .................. 455/435.2; 455/414.1; 455/456.1; 370/331

(58) Field of Classification Search
USPC ......... 455/414.1, 435.2, 456.1–457; 370/328, 370/331
See application file for complete search history.

(56) References Cited

U.S. PATENT DOCUMENTS

| | | | |
|---|---|---|---|
| 2005/0066033 A1 | 3/2005 | Cheston et al. | |
| 2005/0201382 A1* | 9/2005 | Xue et al. ................. | 370/395.21 |
| 2006/0094415 A1* | 5/2006 | Veron ............................ | 455/419 |
| 2006/0194591 A1* | 8/2006 | Xiong et al. ............... | 455/456.2 |
| 2006/0293066 A1* | 12/2006 | Edge et al. ................. | 455/456.3 |
| 2007/0042788 A1* | 2/2007 | Duan .......................... | 455/456.1 |
| 2008/0117859 A1 | 5/2008 | Shahidi et al. | |

(Continued)

FOREIGN PATENT DOCUMENTS

| | | |
|---|---|---|
| CN | 1601961 A | 3/2005 |
| CN | 101543119 A | 9/2009 |
| EP | 2 192 749 A1 | 6/2010 |

(Continued)

OTHER PUBLICATIONS

Official Action letter in the counterpart Russian Patent application No. 2012122359/07(033948) issued on Nov. 12, 2013 (7 pages).

(Continued)

*Primary Examiner* — Daniel Lai
(74) *Attorney, Agent, or Firm* — Osha Liang LLP (57) ABSTRACT

A mobile station UE according to the present invention includes a control unit 12 configured, upon determination based on "EPC-MO-LR support" included in "Attach Accept" or "TAU Accept" received from a mobility management node MME that "EPC-MO-LR" is not supported in a mobile communication system of an E-UTRAN scheme, to switch the E-UTRAN scheme to a UTRAN scheme after establishing a connection in the mobile communication system of the E-UTRAN scheme, and then transmit "NAS MO-LR Request" to a mobile switching center SGSN/MSC.

3 Claims, 8 Drawing Sheets

(56) References Cited

U.S. PATENT DOCUMENTS

| | | | |
|---|---|---|---|
| 2010/0080171 A1* | 4/2010 | Rune et al. | 370/328 |
| 2011/0009130 A1* | 1/2011 | Wu | 455/456.1 |

FOREIGN PATENT DOCUMENTS

| | | |
|---|---|---|
| JP | 2007-134841 A | 5/2007 |
| WO | 2009000316 A1 | 12/2008 |
| WO | 2009/034930 A1 | 3/2009 |

OTHER PUBLICATIONS

Official Action letter in the counterpart Korean Patent application No. 10-2012-7011724 issued on Nov. 18, 2013 (5 pages).

Office Action issued in counterpart Chinese Patent Application No. 201080050098.1 dated Mar. 5, 2014 (9 pages).

International Search Report w/translation from PCT/JP2010/069736 dated Dec. 21, 2010 (4 pages).

3GPP TSG-RAN WG2 #67, R2-094904; "Network positioning support indication"; HTC Corporation; Shenzhen, China; Aug. 24-28, 2009 (2 pages).

3GPP TS 23.272 V9.1.0; 3rd Generation Partnership Project; Technical Specification Group Services and System Aspects; Circuit Switched Fallback in Evolved Packet System; Stage 2 (Release 9); pp. 8-9, 36-38 (7 pages), Sep. 2009.

Japanese Office Action w/English translation mailed on Jan. 4, 2011 corresponding to Japanese Application No. 2009-255588(5 pages).

Office Action dated Oct. 14, 2014 in corresponding Chinese Application No. 2010800500981 (with translation) (11 pages).

* cited by examiner

MOBILE COMMUNICATION METHOD AND MOBILE STATION

TECHNICAL FIELD

The present invention relates to a mobile communication method and a mobile station.

BACKGROUND ART

A mobile communication system of an E-UTRAN scheme is configured to provide "EPC-MO-LR" which is a positioning service for providing location information in response to a request from a predetermined mobile station.

Furthermore, in the mobile communication system of the E-UTRAN scheme, it has been defined that it is possible for a mobile station UE to perform "CS Fallback process" in order to use "MO-LR" which is a positioning service for providing location information in response to a request from a predetermined mobile station in a mobile communication system of a UTRAN scheme.

PRIOR ART DOCUMENT

Non-Patent Document

Non-Patent Document 1: 3GPP TS23.272

However, in the above-mentioned mobile communication system, it is not defined in what situation the mobile station UE should perform the "CS Fallback process" when the mobile station UE in a standby state in the E-UTRAN scheme uses the "MO-LR".

Therefore, even when the "EPC-MO-LR" is supported in the E-UTRAN scheme, since the mobile station UE activates the "CS Fallback process" and uses the "MO-LR" in the mobile communication system of the UTRAN scheme, there is a problem that positioning delay is increased, as compared with the case of using the "EPC-MO-LR" in the mobile communication system of the E-UTRAN scheme without performing the "CS Fallback process".

Furthermore, there is a problem that it is not possible for a network operator to instruct a communication system in which the above-mentioned positioning service is implemented.

SUMMARY OF THE INVENTION

Therefore, the present invention has been achieved in view of the above-described problems, and an object thereof is to provide a mobile communication method and a mobile station, by which it is possible to reduce positioning delay in a positioning service for providing location information in response to a request from the mobile station.

A first characteristic of the present embodiment is summarized as a mobile communication method that includes: a step of switching, by a mobile station, upon determination based on network capability information included in a location registration accept signal or a location information update accept signal received from a core network device of a first communication scheme not corresponding to a circuit switch service that a positioning service for providing location information in response to a request from a predetermined mobile station is not supported in a mobile communication system of the first communication scheme, the first communication scheme to a second communication scheme corresponding to the circuit switch service after establishing a connection in the mobile communication system of the first communication scheme, and then transmitting a use request signal of the positioning service to a core network device of the second communication scheme.

A second characteristic of the present embodiment is summarized as a mobile communication method that includes: a step A of receiving, by a mobile station, a location registration accept signal or a location information update accept signal from a core network device of a second communication scheme corresponding to a circuit switch service; and a step C of switching, by the mobile station, upon determination based on network capability information included in the location registration accept signal or the location information update accept signal that a positioning service for providing location information in response to a request from a predetermined mobile station is not supported in a mobile communication system of the first communication scheme, after establishing a connection in the mobile communication system of the first communication scheme and then switching the second communication scheme to the first communication scheme not corresponding to the circuit switch service, switching the first communication scheme to the second communication scheme, and then transmitting a use request signal of the positioning service to the core network device of the second communication scheme.

A third characteristic of the present embodiment is summarized as a mobile communication method that includes: a step of switching, by a mobile station, upon determination based on network capability information included in a service refusal signal received from a core network device of a first communication scheme not corresponding to a circuit switch service that a positioning service for providing location information in response to a request from a predetermined mobile station is not supported in the mobile communication system of the first communication scheme, switching the first communication scheme to a second communication scheme corresponding to the circuit switch service after establishing a connection in the mobile communication system of the first communication scheme, and then transmitting a use request signal of the positioning service to the core network device of the second communication scheme.

A fourth characteristic of the present invention is summarized as a mobile station that includes; a control unit configured to, upon determination based on a network capability information included in a location registration accept signal or a location information update accept signal received from a core network device of a first communication scheme not corresponding to a circuit switch service that a positioning service for providing location information in response to a request from a predetermined mobile station is not supported in a mobile communication system of the first communication scheme, switch the first communication scheme to a second communication scheme corresponding to a circuit switch service after establishing a connection in the mobile communication system of the first communication scheme, and then transmit a use request signal of the positioning service to a core network device of the second communication scheme.

A fifth characteristic of the present invention is summarized as a mobile station that includes: a reception unit configured to receive a location registration accept signal or a location information update accept signal from a core network device of a second communication scheme corresponding to a circuit switch service; and a control unit configured to, upon determination based on network capability information included in the location registration accept signal or the location information update accept signal that a positioning service for providing location information in response to a request from a predetermined mobile station is not supported in a mobile communication system of the first communication scheme, after establishing a connection in a first communication scheme not corresponding to the circuit switch service, to switch the first communication scheme to the second communication scheme, and then to transmit a use request signal of the positioning service to the core network device of the second communication scheme.

A sixth characteristic of the present invention is summarized as a mobile station that includes a control unit configured to switch, upon determination based on a network capability information included in a service refusal signal received from a core network device of a first communication scheme not corresponding to a circuit switch service that a positioning service for providing location information in response to a request from a predetermined mobile station is not supported in a mobile communication system of the first communication scheme, the first communication scheme to a second communication scheme corresponding to the circuit switch service after establishing a connection in the mobile communication system of the first communication scheme, and then to transmit a use request signal of the positioning service to a core network device of the second communication scheme.

As described above, according to the present invention, it is possible to provide a mobile communication method and a mobile station, by which it is possible to reduce positioning delay in "EPC-MO-LR".

DETAILED DESCRIPTION (Mobile Communication System According to First Embodiment of the Present Invention)

With reference to FIG. 1 to FIG. 9, a mobile communication system according to a first embodiment of the present invention will be described.

The mobile communication system according to the present embodiment includes a mobile communication system of an E-UTRAN scheme and a mobile communication system of a UTRAN scheme.

Figure 1:
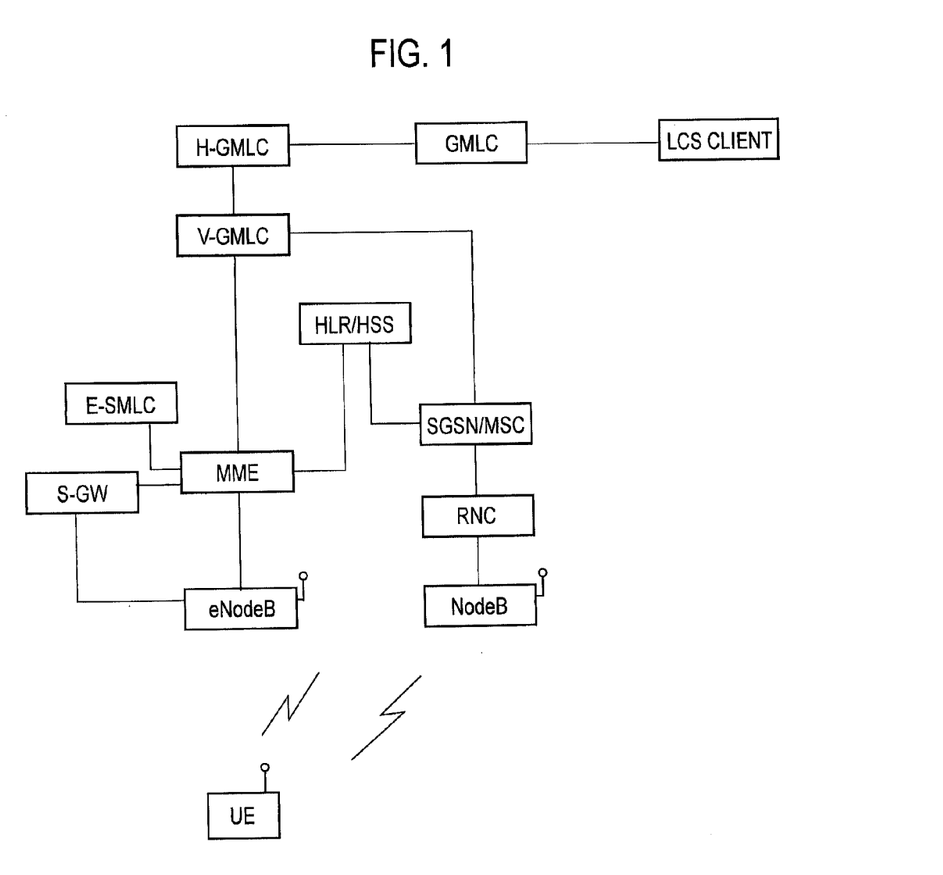
FIG. 1 is a diagram showing the entire configuration of a mobile communication system according to a first embodiment of the present invention.

As illustrated in FIG. 1, the mobile communication system according to the present embodiment is provided with an LCS (Location Services) client, GMLC (Gateway Mobile Location Center), H-GMLC, V-GMLC, HLR (Home Location Register)/HSS (Home Subscriber Server), E-SMLC (EPC-Serving Mobile Location Center), a mobile switching center SGSN/MSC serving as a core network device of the UTRAN scheme, a radio network controller RNC or a radio base station NodeB serving as a radio access network device of the UTRAN scheme, a mobility management node MME (Mobility Management Entity) or a gateway device S-GW (Serving-Gateway) serving as a core network device of the E-UTRAN scheme, and a radio base station eNodeB serving as a radio access network device of the E-UTRAN scheme.

Hereinafter, with reference to FIG. 2 to FIG. 7, the operation of the mobile communication system according to the present embodiment will be described.

Firstly, with reference to FIG. 2 to FIG. 5, a description will be provided for a first operation example when a mobile station UE uses "EPC-MO-LR" or "MO-LR" in the mobile communication system according to the present embodiment.

Figure 2:
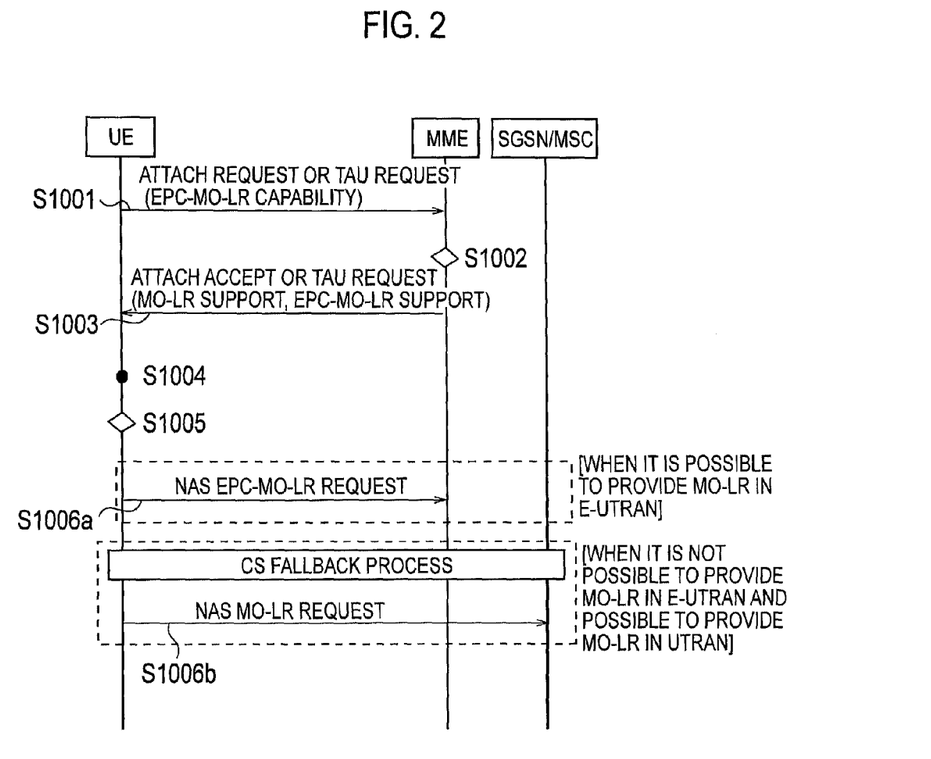
FIG. 2 is a sequence diagram illustrating an operation of the mobile communication system according to the first embodiment of the present invention.

As illustrated in FIG. 2, in step S1001, the mobile station UE transmits "Attach Request" or "TAU (Tracking Area Update) Request" to the mobility management node MME.

Here, the "Attach Request" or the "TAU Request" may include "EPC-MO-LR capability (for example, mobile station information including 1 bit)" indicating whether the mobile station UE is imparted with a capability to use the "EPC-MO-LR".

In step S1002, the mobility management node MME determines whether it is possible for the mobile station UE to use the "EPC-MO-LR", based on the "EPC-MO-LR capability" included in the received "Attach Request" or "TAU Request", contraction information of the mobile station UE, and the like. This determination may be omitted.

In step S1003, the mobility management node MME transmits "Attach Accept" or "TAU Accept" to the mobile station UE, which includes "EPC-MO-LR support (for example, network capability information including 1 bit)" indicating whether the "EPC-MO-LR" is supported in the mobile communication system of the E-UTRAN scheme, and "MO-LR support (for example, network capability information including 1 bit)" indicating whether the "MO-LR" is supported in the mobile communication system of the UTRAN scheme.

Upon determination that it is not possible for the mobile station UE to use the "EPC-MO-LR", based on the "EPC-MO-LR capability", the contraction information of the mobile station UE, and the like, the mobility management node MME does not allow the "EPC-MO-LR support" to be included in the "Attach Accept" or the "TAU Accept" with respect to the mobile station UE.

In addition, the mobility management node MME may not allow the "MO-LR support" to be included in the "Attach Accept" or the "TAU Accept", wherein the "MO-LR support" indicates whether the "MO-LR" is supported in the mobile communication system of the UTRAN scheme.

Furthermore, if the mobile station UE in a standby state in the E-UTRAN scheme detects the occurrence of a positioning event in step S1004, the mobile station UE determines whether the "EPC-MO-LR" is supported in the mobile communication system of the E-UTRAN scheme, based on the "EPC-MO-LR support" included in the "Attach Accept" or the "TAU Accept" received in step S1003, in step S1005.

Here, when the received "Attach Accept" or "TAU Accept" includes the "MO-LR support", the mobile station UE may determine whether the "MO-LR" is supported in the mobile communication system of the UTRAN scheme, based on the "MO-LR support".

Upon determination that the "EPC-MO-LR" is supported in the mobile communication system of the E-UTRAN scheme, the mobile station UE transmits "NAS EPC-MO-LR Request" to the mobility management node MME in step S1006a.

Figure 3:
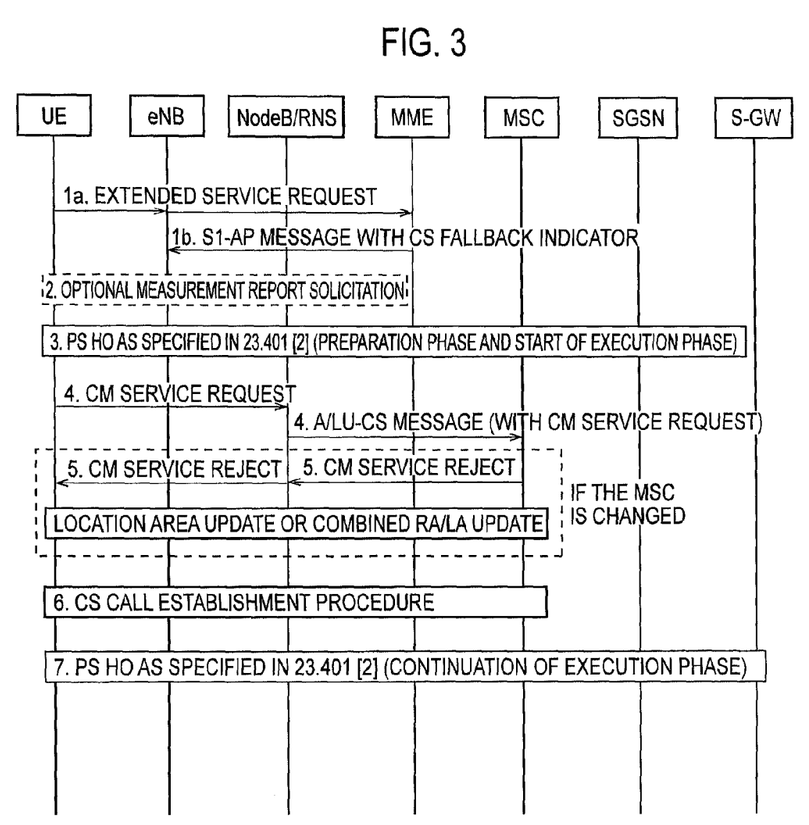
FIG. 3 is a sequence diagram illustrating a CS Fallback procedure in the mobile communication system according to the first embodiment of the present invention.

Meanwhile, upon determination that the "EPC-MO-LR" is not supported in the mobile communication system of the E-UTRAN scheme and the "MO-LR" is supported in the mobile communication system of the UTRAN scheme, the mobile station UE performs "CS Fallback process" illustrated in FIG. 3, and then transmits "NAS MO-LR Request" to the mobile switching center SGSN/MSC in step S1006b.

Here, upon determination that the "EPC-MO-LR" is not supported in the mobile communication system of the E-UTRAN scheme, the mobile station UE may perform the "CS Fallback process" illustrated in FIG. 3, and then transmit the "NAS MO-LR Request" to the mobile switching center SGSN/MSC in step S1006b, regardless of whether the "MO-LR" is supported in the mobile communication system of the UTRAN scheme.

Figure 4:
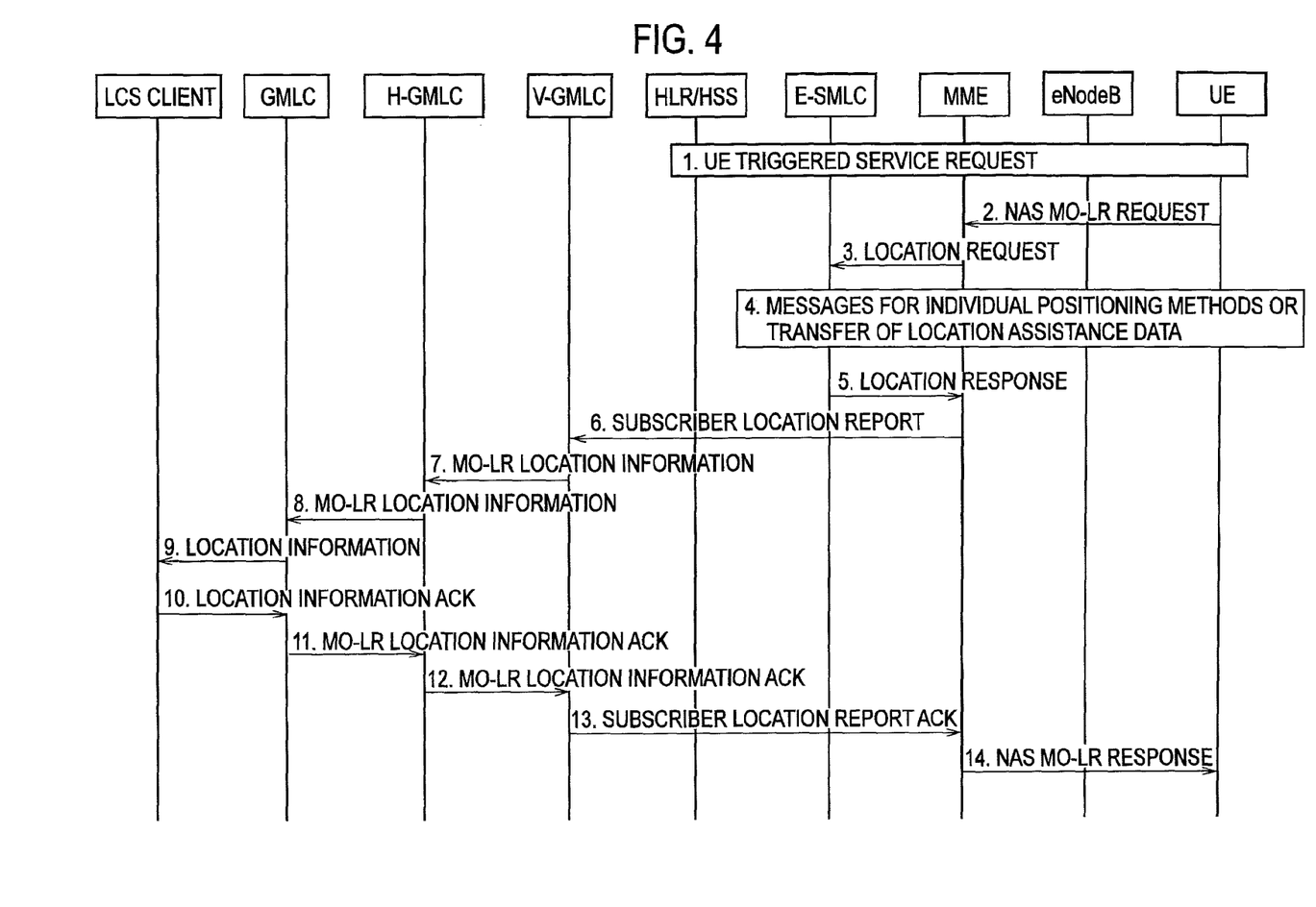
FIG. 4 is a sequence diagram illustrating an MO-LO procedure in the mobile communication system according to the first embodiment of the present invention.

FIG. 4 illustrates an operation after step S1006a. Here, "2. NAS MO-LR Request" illustrated in FIG. 4 corresponds to the "NAS EPC MO-LR Request" which is transmitted by the mobile station UE in step S1006a.

In addition, "1. UE Triggered Service Request" illustrated in FIG. 4 corresponds to an operation performed only when the mobile station UE is in an idle state.

Figure 5:
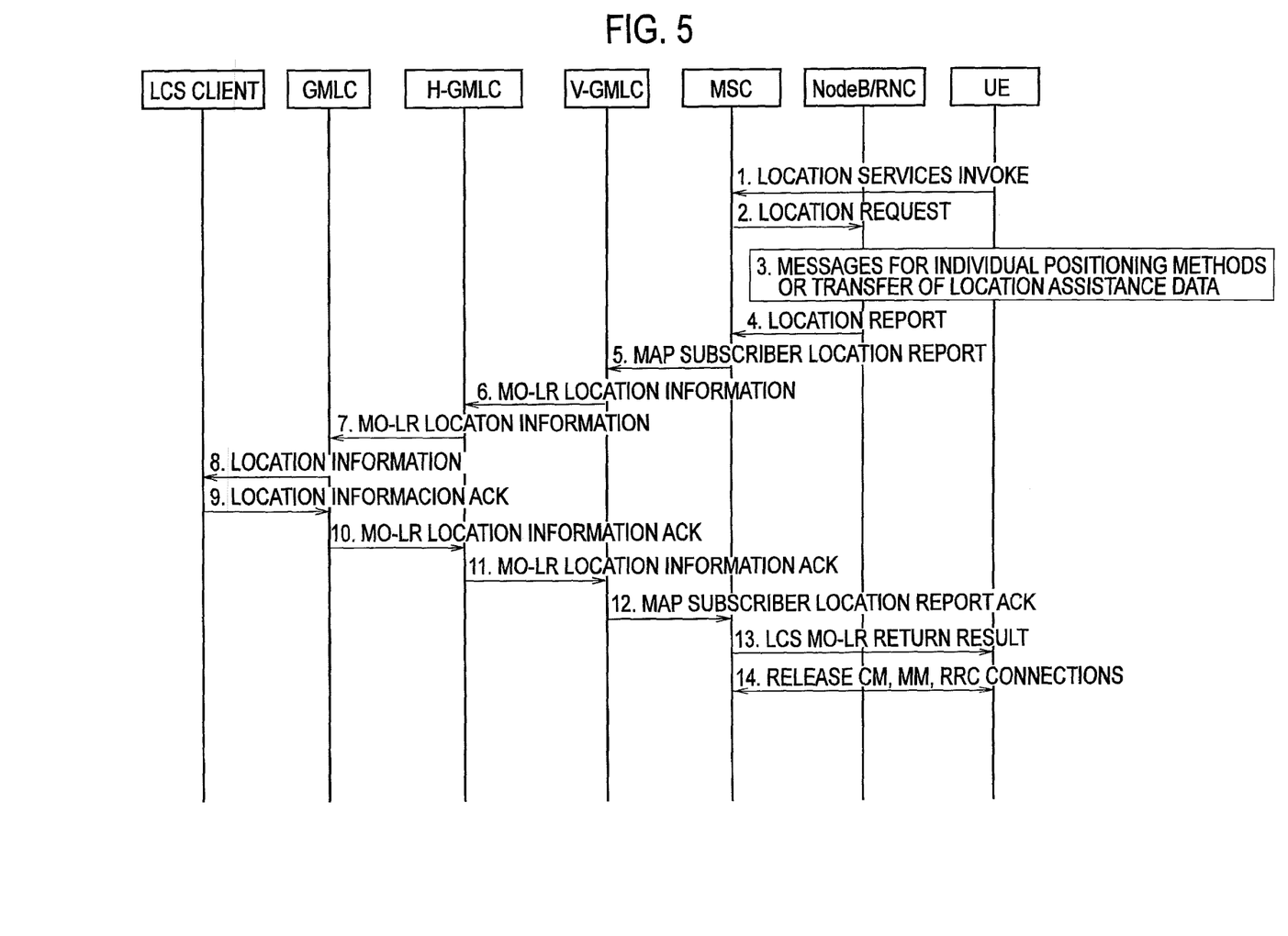
FIG. 5 is a sequence diagram illustrating the MO-LO procedure in the mobile communication system according to the first embodiment of the present invention.

FIG. 5 illustrates an operation after step S1006b. Here, "41. Location Services Invoke" illustrated in FIG. 5 corresponds to the "NAS MO-LR Request" which is transmitted by the mobile station UE in step S1006b.

Secondly, with reference to FIG. 3 to FIG. 6, a description will be provided for a second operation example when the mobile station UE uses the "EPC-MO-LR" or the "MO-LR" in the mobile communication system according to the present embodiment.

Figure 6:
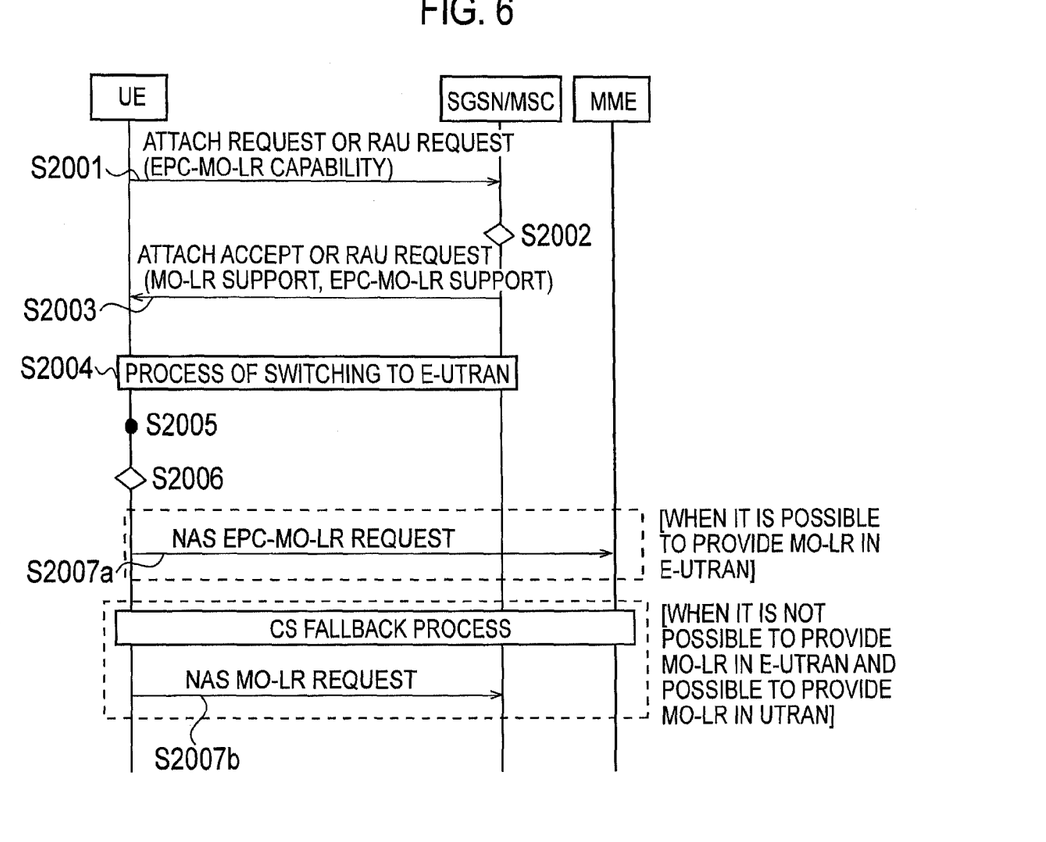
FIG. 6 is a sequence diagram illustrating an operation of the mobile communication system according to the first embodiment of the present invention.

As illustrated in FIG. 6, in step S2001, the mobile station UE transmits the "Attach Request" or "RAU (Routing Area Update) Request" to the mobile switching center SGSN/MSC. In addition, the "RAU Request" corresponds to "LAU (Location Area Update) Request" when it is transmitted to the mobile switching center MSC.

Here, the "Attach Request" or the "RAU Request" may include the "EPC-MO-LR capability".

In step S2002, the mobile switching center SGSN/MSC determines whether it is possible for the mobile station UE to use the "EPC-MO-LR", based on the "EPC-MO-LR capability" included in the received "Attach Request" or "RAU Request", contraction information of the mobile station UE, and the like. This determination may be omitted.

In step S2003, the mobile switching center SGSN/MSC transmits the "Attach Accept" or "RAU Accept" to the mobile station UE, which includes the "EPC-MO-LR support (for example, network capability information including 1 bit)" indicating whether the "EPC-MO-LR" is supported in the mobile communication system of the E-UTRAN scheme, and the "MO-LR support (for example, network capability information including 1 bit)" indicating whether the "MO-LR" is supported in the mobile communication system of the UTRAN scheme. In addition, the "RAU Accept" corresponds to "LAU (Location Area Update) Accept" when it is transmitted by the mobile switching center MSC.

Upon determination that it is not possible for the mobile station UE to use the "EPC-MO-LR", based on the "EPC-MO-LR capability", the contraction information of the mobile station UE, and the like, the mobile switching center SGSN/MSC does not allow the "EPC-MO-LR support" to be included in the "Attach Accept" or the "RAU Accept" with respect to the mobile station UE.

In addition, the mobile switching center SGSN/MSC may not allow the "MO-LR support" to be included in the "Attach Accept" or the "RAU Accept", wherein the "MO-LR support" indicates whether the "MO-LR" is supported in the mobile communication system of the UTRAN scheme.

Then, the mobile station UE starts communication, and switches the UTRAN scheme to the E-UTRAN scheme in step S2004.

If the mobile station UE during communication in the E-UTRAN scheme detects the occurrence of a positioning event in step S2005, the mobile station UE determines whether the "EPC-MO-LR" is supported in the mobile communication system of the E-UTRAN scheme, based on the "EPC-MO-LR support" included in the "Attach Accept" or the "RAU Accept" received in step S2003, in step S2006.

Here, when the received "Attach Accept" or "RAU Accept" includes the "MO-LR support", the mobile station UE may determine whether the "MO-LR" is supported in the mobile communication system of the UTRAN scheme, based on the "MO-LR support".

Upon determination that the "EPC-MO-LR" is supported in the mobile communication system of the E-UTRAN scheme, the mobile station UE transmits the "NAS EPC-MO-LR Request" to the mobility management node MME in step S2007a.

Meanwhile, upon determination that the "EPC-MO-LR" is not supported in the mobile communication system of the E-UTRAN scheme and the "MO-LR" is supported in the mobile communication system of the UTRAN scheme, the mobile station UE performs the "CS Fallback process" illustrated in FIG. 3, and then transmits the "NAS MO-LR Request" to the mobile switching center SGSN/MSC in step S2007b.

Here, upon determination that the "EPC-MO-LR" is not supported in the mobile communication system of the E-UTRAN scheme, the mobile station UE may perform the "CS Fallback process" illustrated in FIG. 3, and then transmit the "NAS MO-LR Request" to the mobile switching center SGSN/MSC in step S2007b, regardless of whether the "MO-LR" is supported in the mobile communication system of the UTRAN scheme.

FIG. 4 illustrates an operation after step S2007a and FIG. 5 illustrates an operation after step S2007b.

Thirdly, with reference to FIG. 3 to FIG. 5 and FIG. 7, a description will be provided for a third operation example when the mobile station UE uses the "EPC-MO-LR" or the "MO-LR" in the mobile communication system according to the present embodiment.

Figure 7:
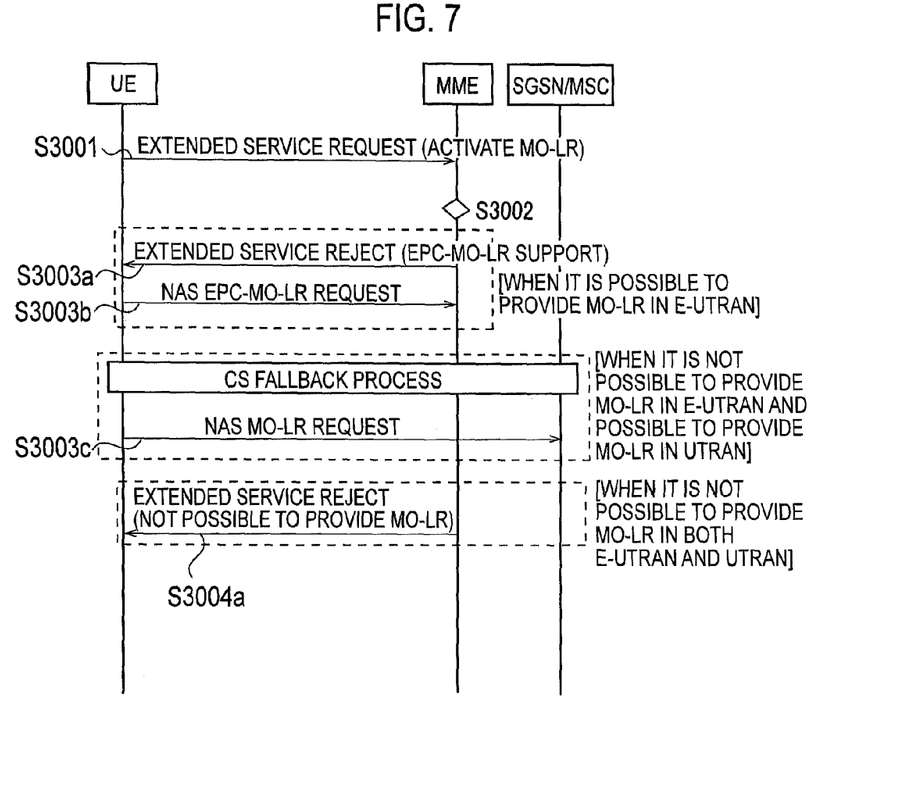
FIG. 7 is a sequence diagram illustrating the operation of the mobile communication system according to the first embodiment of the present invention.

As illustrated in FIG. 7, in step S3001, the mobile station UE transmits "Extended Service Request" for requesting the start of the "CS Fallback process" to the mobility management node MME.

In step S3002, the mobility management node MME determines whether the "EPC-MO-LR" is supported in the mobile communication system of the E-UTRAN scheme and the "MO-LR" is supported in the mobile communication system of the UTRAN scheme.

Upon determination that the "EPC-MO-LR" is supported in the mobile communication system of the E-UTRAN scheme, the mobility management node MME transmits "Extended Service Reject" including the "EPC-MO-LR support" indicating the determination result to the mobile station UE in step S3003a, and the mobile station UE transmits the "NAS EPC-MO-LR Request" to the mobility management node MME in step S3003b. Then, the operation illustrated in FIG. 4 is performed.

In addition, the "Extended Service Reject" may correspond to an S1-AP signal transmitted from the mobility management node MME to the E-UTRAN, and the S1-AP signal may notify the mobile station UE of the "EPC-MO-LR support" through the E-UTRAN.

Meanwhile, upon determination that the "EPC-MO-LR" is not supported in the mobile communication system of the E-UTRAN scheme and the "MO-LR" is supported in the mobile communication system of the UTRAN scheme, the "CS Fallback process" illustrated in FIG. 3 is performed subsequent to step S3001, and the mobile station UE transmits the "NAS MO-LR Request" to the mobile switching center SGSN/MSC in step S3003c. Then, the operation illustrated in FIG. 5 is performed.

Furthermore, upon determination that the "EPC-MO-LR" is not supported in the mobile communication system of the E-UTRAN scheme and the "MO-LR" is not supported in the mobile communication system of the UTRAN scheme, the mobility management node MME transmits the "Extended Service Reject" including the determination result to the mobile station UE.

In addition, the "Extended Service Reject" may correspond to the S1-AP signal transmitted from the mobility management node MME to the E-UTRAN, and through the E-UTRAN, the S1-AP signal may notify the mobile station UE of the fact that it is not possible to provide a positioning service for providing location information in response to a request from the mobile station UE.

Figure 8:
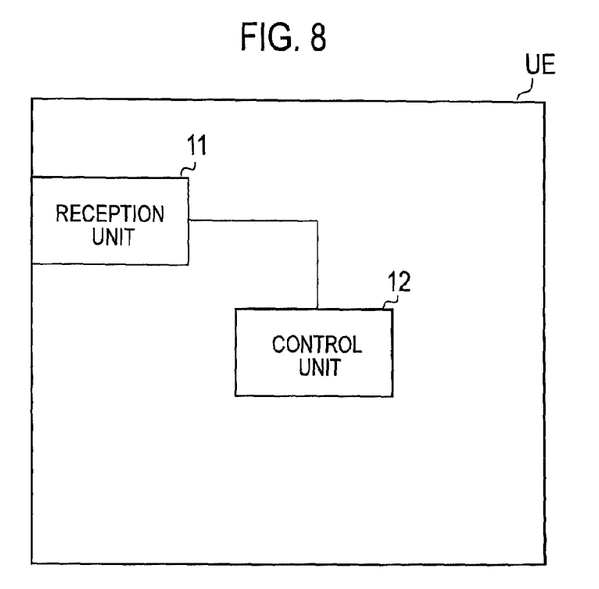
FIG. 8 is a functional block diagram of a mobile station according to the first embodiment of the present invention.

As illustrated in FIG. 8, the mobile station UE according to the present embodiment includes a reception unit 11 and a control unit 12.

The reception unit 11 is configured to receive the "Attach Accept", the "TAU Accept", the "Extended Service Reject" and the like from the mobility management node MME.

Furthermore, the reception unit 11 is configured to receive the "Attach Accept", the "RAU Accept" and the like from the mobile switching center SGSN/MSC.

Hereinafter, with reference to FIG. 9, the operation of the control unit 12 will be described.

Figure 9:
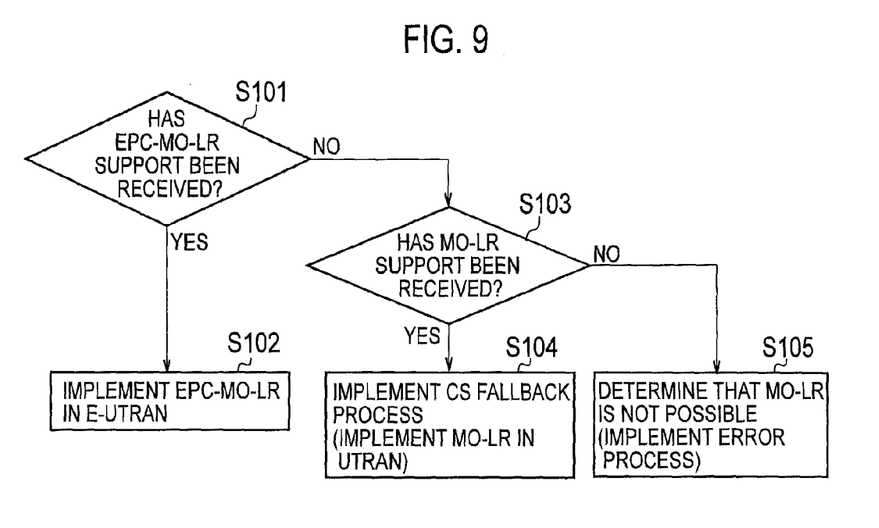
FIG. 9 is a flowchart illustrating the operation of the mobile station according to the first embodiment of the present invention.

As illustrated in FIG. 9, the control unit 12 determines whether the "EPC-MO-LR support", which indicates that the "EPC-MO-LR" is supported in the mobile communication system of the E-UTRAN scheme, is included in the "Attach Accept", the "TAU Accept", the "RAU Accept", or the "Extended Service Reject", which is received in the reception unit 11.

In the case of "YES", the present operation proceeds to step S102. In the case of "NO", the present operation proceeds to step S103.

In step S102, the control unit 12 transmits the "NAS EPC-MO-LR Request" to the mobility management node MME.

In step S103, the control unit 12 determines whether the "MO-LR support", which indicates that the "MO-LR" is supported in the mobile communication system of the UTRAN scheme, is included in the "Attach Accept", the "TAU Accept", the "RAU Accept", or the "Extended Service Reject", which is received in the reception unit 11.

In the case of "YES", the present operation proceeds to step S104. In the case of "NO", the present operation proceeds to step S105.

In step S104, the control unit 12 performs the "CS Fallback process" and then transmits the "NAS MO-LR Request" to the mobile switching center SGSN/MSC.

In step S105, the control unit 12 determines that it is not possible to use both the "EPC-MO-LR" and the "MO-LR", and performs an error process.

In addition, upon determination that the "EPC-MO-LR support", which indicates that the "EPC-MO-LR" is supported in the mobile communication system of the E-UTRAN scheme, is not included in the "Attach Accept", the "TAU Accept", the "RAU Accept", or the "Extended Service Reject" which is received in the reception unit 11, the control unit 12 may perform the "CS Fallback process" and then transmit the "NAS MO-LR Request" to the mobile switching center SGSN/MSC without performing step S103.

In accordance with the mobile communication system according to the first embodiment of the present invention, in the case of using the positioning service, since it is possible for the mobile station UE to determine whether to perform the "CS Fallback" based on the "EPC-MO-LR support", even when the "EPC-MO-LR" is supported in the E-UTRAN scheme, it is possible to solve the problem that the "CS Fallback process" is activated and positioning delay is increased.

Furthermore, in accordance with the mobile communication system according to the first embodiment of the present invention, it is possible for a network operator to designate a positioning service of the E-UTRAN scheme or the UTRAN scheme, which is to be used by the mobile station UE.

The characteristics of the present embodiment as described above may be expressed as follows.

A first characteristic of the present embodiment is summarized as a mobile communication method includes: a step of switching, by a mobile station UE, upon determination based on "EPC-MO-LR support (network capability information)" included in "Attach Accept (a location registration accept signal)" or "TAU Accept (a location information update accept signal)" received from a mobility management node MME (a core network device) of an E-UTRAN scheme (a first communication scheme not corresponding to a circuit switch service) that "EPC-MO-LR (a positioning service for providing location information in response to a request from a predetermined mobile station in the first communication scheme)" is not supported in a mobile communication system of the E-UTRAN scheme (the first communication scheme), the E-UTRAN scheme to a UTRAN scheme (a second communication scheme corresponding to the circuit switch service) after establishing a connection in the mobile communication system of the E-UTRAN scheme, and then transmitting "NAS MO-LR Request (a use request signal of a positioning service)" to a mobile switching center SGSN/MSC (a core network device) of the UTRAN scheme.

In the first characteristic of the present embodiment, in the step, upon determination based on the "EPC-MO-LR support" and "MO-LR support" that the "EPC-MO-LR" is not supported in the mobile communication system of the E-UTRAN scheme and "MO-LR" is supported in a mobile communication system of the UTRAN scheme, the mobile station UE may switch the E-UTRAN scheme to the UTRAN scheme after establishing a connection in the mobile communication system of the E-UTRAN scheme, and then transmit the "NAS MO-LR Request" to the mobile switching center SGSN/MSC.

A second characteristic of the present embodiment is summarized as a mobile communication method includes: a step A of receiving, by a mobile station UE, "Attach Accept" or "RAU Accept (a location information update accept signal)"

from a mobile switching center SGSN/MSC; and a step B of switching, by the mobile station UE, upon determination based on "EPC-MO-LR support" included in the "Attach Accept" or the "RAU Accept" that "EPC-MO-LR" is not supported in a mobile communication system of an E-UTRAN scheme after establishing a connection in a mobile communication system of a UTRAN scheme and then switching the UTRAN scheme to the E-UTRAN scheme, the E-UTRAN scheme to the UTRAN scheme, and then transmitting "NAS MO-LR Request" to the mobile switching center SGSN/MSC.

In the second characteristic of the present embodiment, in the step B, upon determination based on the "EPC-MO-LR support" and "MO-LR support" that the "EPC-MO-LR" is not supported in the mobile communication system of the E-UTRAN scheme and "MO-LR" is supported in a mobile communication system of the UTRAN scheme, the mobile station UE may switch the E-UTRAN scheme to the UTRAN scheme and then transmit the "NAS MO-LR Request" to the mobile switching center SGSN/MSC.

A third characteristic of the present embodiment is summarized as a mobile communication method includes: a step of switching, by a mobile station UE, upon determination based on "EPC-MO-LR support" included in "Extended Service Reject (a service reject signal)" received from a mobility management node MME that "EPC-MO-LR" is not supported in a mobile communication system of an E-UTRAN scheme, the E-UTRAN scheme to a UTRAN scheme after establishing a connection in the mobile communication system of the E-UTRAN scheme, and then transmitting "NAS MO-LR Request" to a mobile switching center SGSN/MSC.

In the third characteristic of the present embodiment, in the step, the mobile station UE may include a step of, upon determination based on the "EPC-MO-LR support" and "MO-LR support" that the "EPC-MO-LR" is not supported in the mobile communication system of the E-UTRAN scheme and "MO-LR" is supported in a mobile communication system of the UTRAN scheme, switching the E-UTRAN scheme to the UTRAN scheme after establishing the connection in the mobile communication system of the E-UTRAN scheme, and then transmitting the "NAS MO-LR Request" to the mobile switching center SGSN/MSC.

A fourth characteristic of the present embodiment is summarized as a mobile station UE includes: a control unit 12 configured to, upon determination based on "EPC-MO-LR support" included in "Attach Accept" or "TAU Accept" received from a mobility management node MME that "EPC-MO-LR" is not supported in a mobile communication system of an E-UTRAN scheme, switch the E-UTRAN scheme to a UTRAN scheme after establishing a connection in the mobile communication system of the E-UTRAN scheme, and then transmit "NAS MO-LR Request" to a mobile switching center SGSN/MSC.

In the fourth characteristic of the present embodiment, the control unit 12 may be configured to, upon determination based on the "EPC-MO-LR support" and "MO-LR support" that the "EPC-MO-LR" is not supported in the mobile communication system of the E-UTRAN scheme and "MO-LR" is supported in a mobile communication system of the UTRAN scheme, switch the E-UTRAN scheme to the UTRAN scheme after establishing the connection in the mobile communication system of the E-UTRAN scheme, and then transmit the "NAS MO-LR Request" to the mobile switching center SGSN/MSC.

A fifth characteristic of the present embodiment is summarized as a mobile station UE includes: a reception unit 11 configured to receive "Attach Accept" or "RAU Accept" from a mobile switching center SGSN/MSC; and a control unit 12 configured to, upon determination based on "EPC-MO-LR support" included in the "Attach Accept" or the "RAU Accept" that "EPC-MO-LR" is not supported in a mobile communication system of an E-UTRAN scheme, switch the E-UTRAN scheme to the UTRAN scheme after establishing a connection in the mobile communication system of the E-UTRAN scheme, and then transmit "NAS MO-LR Request" to the mobile switching center SGSN/MSC device.

In the fifth characteristic of the present embodiment, the control unit 12 may be configured to, upon determination based on the "EPC-MO-LR support" and "MO-LR support" that the "EPC-MO-LR" is not supported in the mobile communication system of the E-UTRAN scheme and "MO-LR" is supported in a mobile communication system of the UTRAN scheme, switch the E-UTRAN scheme to the UTRAN scheme and transmit the "NAS MO-LR Request" to the mobile switching center SGSN/MSC device.

A sixth characteristic of the present embodiment is summarized as a mobile station UE includes: a control unit 12 configured to, upon determination based on "EPC-MO-LR support" included in "Extended Service Reject" received from a mobility management node MME that "EPC-MO-LR" is not supported in a mobile communication system of an E-UTRAN scheme, switch the E-UTRAN scheme to a UTRAN scheme after establishing a connection in the mobile communication system of the E-UTRAN scheme, and then transmit "NAS MO-LR Request" to a mobile switching center SGSN/MSC device.

In the sixth characteristic of the present embodiment, the control unit 12 may be configured to, upon determination based on the "EPC-MO-LR support" and "MO-LR support" that the "EPC-MO-LR" is not supported in the mobile communication system of the E-UTRAN scheme and "MO-LR" is supported in the mobile communication system of the UTRAN scheme, switch the E-UTRAN scheme to the UTRAN scheme after establishing the connection in the mobile communication system of the E-UTRAN scheme, and then transmit the "NAS MO-LR Request" to the mobile switching center SGSN/MSC device.

In addition, the operation of the above-mentioned the radio base station eNodeB or the mobile switching center SGSN/MSC device may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station eNodeB or the mobile switching center SGSN/MSC device. As a discrete component, such storage medium and processor may be arranged in the radio base station eNodeB or the mobile switching center SGSN/MSC device.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

The invention claimed is:

1. A mobile communication method, comprising:
a step of notifying, by a core network device of a first communication scheme not corresponding to a circuit switch service, a mobile station of whether a positioning service for providing location information in response to a request from a predetermined mobile station is supported in a packet switch service of a mobile communication system of the first communication scheme, and whether the positioning service is supported in a circuit switch service of a mobile communication system of a second communication scheme, by using network capability information included in a location registration accept signal or a location information update accept signal; and
a step of switching, by the mobile station, upon determination that the positioning service is not supported in the packet switch service of the mobile communication system of the first communication scheme and upon determination that the positioning service is supported in the circuit switch service of the mobile communication system of the second communication scheme, based on the network capability information, the packet switch service of the mobile communication system of the first communication scheme to the circuit switch service of the mobile communication system of the second communication scheme after establishing a connection in the packet switch service of the mobile communication system of the first communication scheme, and then transmitting a use request signal of the positioning service in the circuit switch service of the mobile communication system of the second communication scheme, to a core network device of the second communication scheme, the network capability information being received from the core network device of the first communication scheme, and indicating support of the positioning service in the packet switch service of the mobile communication system of the first communication scheme and support of the positioning service in the mobile communication system of the second communication scheme.

2. A mobile station comprising a control unit configured to:
switch, upon determination that a positioning service for providing location information in response to a request from a predetermined mobile station in a packet switch service in a mobile communication system of a first communication scheme is not supported and the positioning service is supported in a circuit switch service in a mobile communication system of a second communication scheme, based on network capability information included in a location registration accept signal or a location information update accept signal received from a core network device of the first communication scheme not corresponding to a circuit switch service, the packet switch service of the mobile communication system of the first communication scheme to the circuit switch service of the mobile communication system of the second communication scheme after establishing a connection in the packet switch service of the mobile communication system of the first communication scheme, and then
transmit a use request signal of the positioning service in the circuit switch service of the mobile communication system of the second communication scheme, to a core network device of the second communication scheme, the network capability information being received from the core network device of the first communication scheme, and indicating support of the positioning service in the packet switch service of the mobile communication system of the first communication scheme and support of the positioning service in the mobile communication system of the second communication scheme.

3. A core network device of a first communication scheme not corresponding to a circuit switch service, wherein
the core network device is configured to notify a mobile station whether a positioning service for providing location information in response to a request from a predetermined mobile station in a packet switch service of a mobile communication system of the first communication scheme is supported, and whether the positioning service in a circuit switch service of a mobile communication system of a second communication scheme is supported, by using network capability information included in a location registration accept signal or a location information update accept signal, the network capability information indicating support of the positioning service in the packet switch service of the mobile communication system of the first communication scheme and support of the positioning service in the mobile communication system of the second communication scheme.

* * * * *